US 11,528,941 B2

(12) United States Patent
Maeder et al.

(10) Patent No.: US 11,528,941 B2
(45) Date of Patent: Dec. 20, 2022

(54) PRODUCT RECOGNITION IN AEROSOL GENERATING DEVICES

(71) Applicant: PHILIP MORRIS PRODUCTS S.A., Neuchâtel (CH)

(72) Inventors: Serge Maeder, Peseux (CH); Rui Nuno Batista, Morges (CH)

(73) Assignee: Philip Morris Products S.A., Neuchâtel (CH)

( * ) Notice: Subject to any disclaimer, the term of this patent is extended or adjusted under 35 U.S.C. 154(b) by 821 days.

(21) Appl. No.: 16/468,148

(22) PCT Filed: Dec. 4, 2017

(86) PCT No.: PCT/IB2017/057617
§ 371 (c)(1),
(2) Date: Jun. 10, 2019

(87) PCT Pub. No.: WO2018/109611
PCT Pub. Date: Jun. 21, 2018

(65) Prior Publication Data
US 2019/0307177 A1 Oct. 10, 2019

(30) Foreign Application Priority Data
Dec. 12, 2016 (EP) .................................... 16203563

(51) Int. Cl.
*A24F 40/51* (2020.01)
*G01N 27/416* (2006.01)
(Continued)

(52) U.S. Cl.
CPC ................ *A24F 40/51* (2020.01); *A24D 1/20* (2020.01); *A24F 40/485* (2020.01);
(Continued)

(58) Field of Classification Search
CPC ............ H05B 2203/021; H05B 1/0244; H05B 2203/015; H05B 3/0014; H05B 3/06;
(Continued)

(56) References Cited

U.S. PATENT DOCUMENTS 5,571,401 A  11/1996 Lewis et al.
8,449,824 B2  5/2013 Sun
(Continued)

FOREIGN PATENT DOCUMENTS

CN  103330274 A  10/2013
CN  103932406 A  7/2014
(Continued)

OTHER PUBLICATIONS

Dwyer, Model DPL110 Dual Point Level Switch, May 16, 2015 (Year: 2015).*
(Continued)

*Primary Examiner* — Chris Q Liu
(74) *Attorney, Agent, or Firm* — Mueting Raasch Group (57) ABSTRACT

An aerosol generating system includes a container (150) housing an aerosol generating substrate and a product identifying compound (155) associated with the container (150). The system further includes an electronic article (100) configured to receive the container (150). The electronic article (100) includes control electronics (200) and an electrochemical sensor switch (10, 20) operably coupled to the control electronics (200). The electrochemical switch (10, 20) is configured to change from a first state to a second state when the product identifying compound (155) interacts with the electrochemical sensor. The electrochemical sensor switch (10, 20) has a different conductivity in the first state than in the second state. The control electronics (200) are configured to cause the device to generate an aerosol from the aerosol generating substrate when the electrochemical
(Continued)

sensor switch (10, 20) changes states due to interaction with the product identifying compound (155).

15 Claims, 3 Drawing Sheets

(51) Int. Cl.
*H05B 1/02* (2006.01)
*A24D 1/20* (2020.01)
*A24F 40/485* (2020.01)

(52) U.S. Cl.
CPC ......... *G01N 27/416* (2013.01); *H05B 1/0202* (2013.01); *H05B 1/0297* (2013.01)

(58) Field of Classification Search
CPC . H05B 3/12; H05B 3/145; H05B 3/16; H05B 3/34; H05B 3/347; H05B 3/42; H05B 3/46; H05B 1/0297; H05B 1/0202; H05B 3/44; H05B 1/02; H05B 2203/003; H05B 2203/014; H05B 2203/017; H05B 3/20; H05B 1/00; H05B 3/18; H05B 3/265; A24F 40/10; A24F 40/42; A24F 40/46; A24F 40/485; A24F 40/20; A24F 40/44; A24F 40/50; A24F 40/53; A24F 15/015; A24F 25/00; A24F 25/02; A24F 40/00; A24F 40/40; A24F 40/48; A24F 40/51; A24F 40/60; A24F 42/10; A24F 42/60; A24F 40/65; A24F 40/30; A24F 40/90; A24F 47/00; A24F 40/05; A24F 40/49; A24F 40/57; A24F 1/30; A24F 40/465; A24F 40/70; A24F 40/95; A24F 3/00; A24F 40/80; A24F 7/02; A24F 9/00
USPC .................. 131/328, 329, 194, 335; 219/386
See application file for complete search history.

(56) References Cited

U.S. PATENT DOCUMENTS

| | | | | |
|---|---|---|---|---|
| 8,733,346 B2 * | 5/2014 | Rinker | ................... | A24F 42/60 131/194 |
| 9,930,915 B2 | 4/2018 | Worm et al. | | |
| 10,390,563 B2 | 8/2019 | Hawes et al. | | |
| 2013/0220315 A1 | 8/2013 | Conley et al. | | |
| 2015/0272225 A1 | 10/2015 | Worm et al. | | |
| 2016/0021931 A1 | 1/2016 | Hawes et al. | | |
| 2016/0331859 A1 * | 11/2016 | Cameron | ................ | A24F 40/51 |
| 2016/0345634 A1 * | 12/2016 | Fernando | ............. | H02J 7/0024 |
| 2017/0208863 A1 * | 7/2017 | Davis | .................... | A24F 40/485 |
| 2018/0049469 A1 * | 2/2018 | Kaufman | ............ | A24B 15/167 |

FOREIGN PATENT DOCUMENTS

| | | | | |
|---|---|---|---|---|
| CN | 105095810 | | 11/2015 | |
| EP | 1099102 B1 | | 5/2008 | |
| EP | 2838385 B1 | | 11/2019 | |
| RU | 2604313 C2 | | 12/2016 | |
| WO | WO 2010/003480 A1 | | 1/2010 | |
| WO | WO 2013/098398 A2 | | 7/2013 | |
| WO | WO 2014/125483 A1 | | 8/2014 | |
| WO | WO 2014/199233 A2 | | 12/2014 | |
| WO | WO 2015/082560 A1 | | 6/2015 | |
| WO | WO-2015082560 A1 * | | 6/2015 | ........... A24B 15/167 |
| WO | 20150112213 | | 7/2015 | |
| WO | 20150140312 | | 9/2015 | |
| WO | WO 2016/199066 A1 | | 12/2016 | |

OTHER PUBLICATIONS

Russian Office Action and Search Report for 2019121688 issued by the Patent Office of the Russian Federation; dated Apr. 23, 2021.
Extended European Search Report for EP 16203563, issued by the European Patent Office dated Mar. 15, 2017; 8 pgs.
International Search Report and Written Opinion for PCT/IB2017/057617, issued by the European Patent Office dated Mar. 7, 2018; 15 pgs.
Arash & Wang, "Detection of gas atoms with carbon nanotubes," Scientific Reports, dated May 7, 2013;3: 1782.
Zhang, Jingqing, "Molecular Recognition using nanotube-adsorbed polymer complexes," Massachusetts Institute of Technology, Thesis; 2012; 273 pgs.
Chinese Office Action issued for CN 201780071121.7 by the Chinese Patent Office; dated Jul. 5, 2021; 15 pgs including English Translation.
Japanese Office Action for JP Application No. 2019-551764 issued by the Japanese Patent Office dated Jan. 4, 2022 3 pgs. including English translation.

* cited by examiner

PRODUCT RECOGNITION IN AEROSOL GENERATING DEVICES

This application is the § 371 U.S. National Stage of International Application No. PCT/IB2017/057617, filed 4 Dec. 2017, which claims the benefit of European Application No. 16203563.8, filed 12 Dec. 2016.

This disclosure relates to aerosol generating devices. Aspects of the invention find particular application in relation to aerosol generating devices including consumable aerosol generating substrates. Examples of the invention described relate to electronic aerosol generating articles.

Electronic aerosol generating articles are typically configured to receive a container housing an aerosol generating substrate. After use of the container or depletion of the aerosol generating substrate, the container may be removed from article and replaced with a fresh container. The containers may be, for example, wrappers that circumscribe a tobacco rod, cartridges containing a liquid source of nicotine, or cartridges containing dry powder nicotine.

Regardless of the type of container or aerosol generating article, counterfeit products present substantial challenges because it may be difficult to establish whether the containers or aerosol generating substrates meet the standards of the manufacturer of the electronic aerosol generating article.

One object of the present invention is to manufacture an electronic aerosol generating article and system having enhanced ability to verify aerosol generating contents of a container for use with the aerosol generating article. Other objects of the present invention will be evident to those of skill in the art upon reading and understanding the present disclosure, which includes the claims that follow and the accompanying drawings.

In an aspect of the present invention, an aerosol generating system includes a container housing an aerosol generating substrate and a product identifying compound associated with the container. The system further includes an electronic article configured to receive the container. The electronic article includes control electronics and an electrochemical sensor switch operably coupled to the control electronics. The electrochemical switch is configured to change from a first state to a second state when the product identifying compound interacts with the electrochemical sensor. The electrochemical switch has a different conductivity in the first state than in the second state. The control electronics are configured to cause the device to generate an aerosol from the aerosol generating substrate when the electrochemical sensor switch changes states due to interaction with the product identifying compound.

The first state of the switch may be considered to be electrically "opened" or "closed." The second state of the switch may be considered to be electrically "closed" or "opened," provided that if the first state is considered opened, the second state is considered closed, and if the first state is considered closed, the second state is considered opened. "Open" and "closed," with respect to an electrochemical switch may be considered relative rather than absolute. Preferably, the second state of the electrochemical switch is electrically "closed" relative to the first state.

Preferably, the difference in conductivity between the first and second states of the electrochemical switch is at least 20%; such as at least 30% or at least 40%. More preferably, the difference in conductivity between the first and second states of the electrochemical switch is at least 50%.

The "closed" state, whether the closed state is the first or second state, may be up to 1000 times more conductive than the "open" state. For example, the closed state may be up to 100 times more conductive than the open state or up to 10 times more conductive than the open state.

In an aspect of the present invention, an electronic article is configured to receive a container housing an aerosol generating substrate. The container includes a product identifying compound. The electronic article comprises control electronics and an electrochemical sensor switch operably coupled to the control electronics. The electrochemical sensor switch is configured to change from a first state to a second state when the product identifying compound interacts with the electrochemical sensor. The electrochemical switch has a different conductivity in the first state than in the second state. The control electronics are configured to cause the electronic article to generate an aerosol from the aerosol generating substrate when the electrochemical sensor switch assumes the second state.

In an aspect of the present invention, a nicotine-containing device for use in an electronic aerosol generating article includes a container and a nicotine-containing aerosol generating substrate disposed in the container. The device further includes a product identifying compound associated with the container. The product identifying compound is configured to be detected by an electrochemical sensor switch of the electronic aerosol generating article to allow the article to generate an aerosol from the aerosol generating substrate when the container is received in the article.

Examples of the invention describe electronic articles that include a sensor configured to detect a chemical signature associated with a consumable aerosol generating substrate. The electronic articles may be smoking articles, pharmaceutical delivery articles, or other articles for delivering an aerosol from an aerosol generating substrate to a user.

Various aspects of the present invention may have one or more advantages relative to currently available or previously described electronic articles and systems. For example, the use of a product identifying compound to serve as a chemical fingerprint to identify a container housing an aerosol generating substrate that may be detectable by the electronic article provides an alternative solution to authentication. Further, if the product identifying compound is present at levels detectable by the electronic article for a limited amount of time, repeated or extended use of the container may result in loss of its chemical fingerprint. For example, amounts of the product identifying compound associated with the container may decrease over time if the product identifying compound dissipates over time. Preferably, amounts of the product identifying compound associated with the container dissipate to levels below detection by a sensor of the electronic article within an amount of time less than a typical amount of time for a single use of the container. Thus according to some aspects of the present invention, verification of authenticity may be limited to a single use of the container. If the electronic article is configured to lock out use if the chemical fingerprint (product identifying compound) is not detected and the system is configured to limit detection to a single use, refilling of containers by consumers could be prevented, which could thereby ensure reproducible quality of the experience by ensuring that the aerosol generating substrate in the container is formulated to manufacturer specifications. These and other advantages of various aspects of the present invention will be evident to those of skill in the art upon reading and understanding the present disclosure.

The present invention may be applicable to any suitable electronic article. As used herein, an "electronic article" is an article that has one or more electrical components. Preferably, at least some of the one or more electrical components control delivery of an aerosol from an aerosol generating substrate to a user. The electrical components may include a substrate heater, which may include, for example, one or more electrically resistive elements or may include an electrically controllable valve positioned and configured to allow or prevent passage of an aerosol generated from the substrate to the user. Control of a heater, a valve or other electrical component may be accomplished by control electronics. Control electronics may be provided in any suitable form and may, for example, include a controller or a memory and a controller. The controller may include one or more of an Application Specific Integrated Circuit (ASIC) state machine, a digital signal processor, a gate array, a microprocessor, or equivalent discrete or integrated logic circuitry. Control electronics may include memory that contains instructions that cause one or more components of the control electronics to carry out a function or aspect of the control electronics. Functions attributable to control electronics in this disclosure may be embodied as one or more of software, firmware, and hardware.

Preferably, the electronic article is an article configured to deliver an aerosol to a user. Preferably, the aerosol comprises nicotine. The aerosol may be generated from any suitable aerosol generating substrate. For example, the substrate may include tobacco. In some embodiments, the substrate includes a liquid composition comprising nicotine. In some embodiments, the substrate comprises a dry powder containing nicotine, such as a nicotine salt. Aerosol generating articles described herein include articles that heat, directly or indirectly, an aerosol generating substrate to produce an aerosol and articles that do not heat the substrate but rather use air flow or a chemical reaction to deliver aerosol.

It will be appreciated that an article that does not include control electronics may be readily modified to incorporate control electronics, such as a controllable valve, to carry out one or more embodiments of the present invention.

An electronic article according to the present invention includes a sensor configured to detect a product identifying compound associated with an aerosol generating substrate for use with the article. The product identifying compound may be associated with a container for housing the aerosol generating substrate. A product identifying compound "associated with a container" may be a product identifying compound that may be on or in the container or on or in a substrate housed within the container.

Any appropriate compound may be used as a product identifying compound. Preferably, the product identifying compound is not otherwise present in the container or the substrate housed in the container to allow for detection of the compound among the background of the container and the substrate. Preferably, a product identifying compound is a compound that would not be expected to be present in an environment in which an electronic article would be used so that detection of the product identifying compound may be indicative of the product (the container housing the aerosol generating substrate) rather than background amounts of the compound in the environment. Preferably, the product identifying compound is volatile or is carried in a volatile carrier such as, for example, a volatile solvent. If the product identifying compound is volatile or carried in a volatile carrier, the compound may be transported from the container or the substrate to the sensor on the electronic article, and thus may be detected by the sensor. If the product identifying compound is volatile or carried in a volatile carrier, the compound may dissipate from the container or substrate to levels below the limit of detection of the sensor. Preferably, amounts of the product identifying compound associated with the container dissipate to levels below detection by a sensor of the electronic article within an amount of time less than a typical amount of time for a single use of the container. Thus according to some preferred embodiments of the present invention, verification of authenticity may be limited to a single use of the container. To prevent excessive premature loss of a product identifying compound during, for example, storage of the container prior to use, the container may be sealed in a package through which the product identifying compound has little or no permeability. However, if an appreciable amount of the product identifying compound may be escape the package, dissipate from the container, or otherwise diminish with time during storage, the container or a package in which the container is stored may be marked with an expiration date, a "best before" date, or the like.

Non-limiting examples of product identifying compounds that may be employed in accordance with the teachings presented herein include isomeric compounds, such as xylene isomers, and amine-containing compounds.

Preferably, the product identifying compound is present at a sufficiently low concentration that it is not perceivable by a user but is present at a concentration that is sufficiently high to be detected by a sensor of the electronic article. The distance of the source of the product identifying compound from the sensor and the sensitivity of the sensors may be factors that may affect the desired concentration of the product identifying compounds.

In some embodiments, the sensors are capable of detecting product identifying compounds in the picogram ($10^{-12}$) range, femtogram ($10^{-15}$) range, or the attogram ($10^{-18}$) range. Accordingly, product identifying compounds may be detected by the sensor even when the source of the product identifying compound is at a very low concentration and at a relatively large distance from the sensor. In some embodiments, the source of the product identifying compound may be positioned such that when the container is received by the electronic article, the source is at a distance from 100 millimetres to 150 millimetres from the sensor.

The product identifying compound may be associated with the container in which an aerosol generating substrate is disposed in any suitable manner. Preferably, the product identifying compound may be present on a housing forming the container. The compound may be present on the inside or the outside of the housing. Preferably, the compound is positioned on the container at a position that will place the compound in proximity to a sensor of the electronic article when the container is received by the electronic article. The product identifying compound may be placed on or in a reservoir that is part of the housing of the container or that is attached to the housing of the container. For example, the compound or a composition comprising the compound may be blotted on paper or other suitable material that may be affixed to the container. In some embodiments, the container comprises paper on which the compound or a composition comprising the compound may be blotted. For example, if the aerosol generating substrate is a rod of tobacco, the container may be a wrapper, such as a paper wrapper, disposed around the rod.

More than one product identifying compound may be associated with the container housing the aerosol generating substrate. An increased number of product identifying compounds may result in a product that is more difficult to counterfeit or that may provide additional information regarding the product. For example, if a manufacturer of containers of aerosol generating substrates manufactures a product line of containers housing 15 different compositions of aerosol generating substrates for use in a compatible electronic article, the manufacture may choose to associate some combination of one or more of five different product identifying compounds with each container so that containers for each product line may have a unique chemical fingerprint defined by the combination of product identifying compounds. An electronic article preferably comprises five different sensors for separately detecting one or more of the five potential product identifying compounds. Data obtained from the sensor regarding the presence or absence of the various product identifying compounds may be used by the electronic article to determine the identity of the contents of the container.

In addition or alternatively to the use of multiple product identifying compounds, any other suitable identifier may be associated with a container housing an aerosol generating substrate. For example, an RFID tag may be associated with the container to indicate the identity of the container or the container and its contents. The use of an RFID tag and a product identifying compound in accordance with the present invention may result in a product (container housing substrate) that is more difficult to counterfeit than a product that includes only an RFID tag for purposes of authentication. In some embodiments, an electronic article may detect an RFID tag associated with a container and detect a product identifying compound associated with the container and use information from the RFID tag to perform a coherence check to verify that the product identifying compound is the compound that is supposed to be associated with the container. Such a coherence check may serve as an additional barrier to counterfeiters.

According to aspects of the present invention, a switch of the control electronics of the electronic article comprises a product identifying compound sensor that changes the switch from a first state, such as relatively opened to closed, to a second state, such as relatively closed or opened, when the sensor is exposed to the product identifying compound. Any suitable sensor for detecting a product identifying compound associated with a container housing an aerosol generating substrate may be used. Preferably, the sensor comprises an electrochemical sensor. For example, the sensor may comprise a composite of carbon nanotube or graphene and a compound that detects the product identifying compound such that the semiconductor or electrical behaviour of the sensor changes based on the presence or absence of the product identifying compound. One suitable electrochemical sensor comprises a composite of a carbon nanotube and a metalloporphyrin that is chemically sensitive to amines. The presence or absence of amines affects the semiconductor properties and electrical behaviour of the sensor. See, for example, Lui et al., "Single-walled carbon nanotube/metalloporphyrin composites for the chemiresistive detection od amines and meat spoilage," Angew Chem Int Ed Engl. 2015 May 26; 54(22):6554-7. See also Singh et al., "Organic functionalisation and characterisation of single-walled carbon nanotubes," Chemical Society Reviews 38(8):2214-30 (September 2009). Any suitable electrochemical sensor that may alter semiconductor or electrical behaviour of the sensor to open or close a switch comprising the sensor may be employed.

If more than one product identifying compound is associated with a container that houses an aerosol generating substrate, the electronic article preferably has more than one sensor. For example, the electronic article may comprise two, three, four, five, or more sensors. Each sensor may be configured as a switch integrated into a circuit for detecting a given product identifying compound or combination of product identifying compounds associated with a container. For example if a product line of containers may include a combination of any one or more of five different product identifying compounds, an electronic article may include five sensors, each configured to detect a different product identifying compound, even if any given container in the product line may contain less than five different product identifying compounds.

Any suitable coating or layer may be incorporated into a circuit for detecting a product identifying compound. For example, chemiresistive or semiconductive materials, such as carbon nanotubes coated with a polythiophene, such as a calixarene-substituted type of material as host-guest chemistry, as well as graphene substrates impregnated with a polythiophene, may have a selective response to xylene molecules or derivatives of xylene molecules, and may be highly or ultra-sensitive and may demonstrate conductance changes detectable at room temperature and atmospheric pressure. Coating Carbon nanotubes (CNTs) or Single-walled Carbon Nanotubes (SWNTs, SWCNTs) with gold-hafnium may amplify the detection capabilities. By way of further example, carbon nanotube/metalloporphyrin composites may be used to detected amine-containing compounds as described above.

Preferably the sensor is flexible if the electronic article is flexible or bendable. Examples of flexible sensors include carbon nanotube or graphene structure-based sensors.

Regardless of the product identifying compound detected, data obtained by a sensor of an electronic article of the present invention may be used for any one or more suitable purpose, only a few of which are described in the present disclosure in more detail.

In preferred embodiments, an electronic article includes a product identifying compound sensor operably coupled to memory, such as RAM, to store data obtained from the sensor. Memory may be operably coupled to appropriate computing apparatus to analyse the sensor data to, for example, analyse whether the data is indicative of the presence of the product identifying compound. In addition or alternatively, the electronic article may include output apparatus to transfer stored sensor data to another device for display, analysis or display and analysis. Output apparatus may include output communication apparatus. Output communication apparatus may be wired or wireless communication apparatus. Wired output communication apparatus may include one or more ports, such as a USB port or a fire wire port, for operably coupling the electronic article to another computing apparatus, such as a smart mobile phone or a computer. Wireless communication apparatus include telemetry, Bluetooth, infrared, or other wireless transmitters for operably coupling the electronic article to another computing apparatus, such as a smart mobile phone or a computer. The computer, smart mobile phone, or other computing apparatus may be used to receive data obtained from a sensor. The computing apparatus may then be used to analyse the sensed data. Computing apparatus, whether part of the electronic article or part of a remote device, may be used to provide information to a consumer. For example, audible, tactile, or visual feedback may be provided to the consumer that the container is authentic and the device is ready for use or that the container has not been detected as being authentic and the device is not ready for use.

In some embodiments, data obtained by a sensor of an electronic article according to the present invention may be provided to a centralized data centre, the value of the container read by the electronic article will be kept in memory by the electronic article and communicated, possibly with other values including an electronic article identifier, to the centralized data centre. Such process could help to further prevent counterfeit in case counterfeiters were able to forge a counterfeit RFID tag with an existing compatible container identifier, by communicating to electronic articles black listed container identifiers.

The electronic article may comprise location identification apparatus that may be embodied in one or more of hardware, software, firmware. For example, the device may comprise a GPS receiver for identifying location based on a global positioning system. The device may include antenna for receiving cell phone signals, Wi-Fi signals or the like for employing assisted-GPS. Any other suitable location identifying apparatus may be employed.

The use of location identification apparatus allows the electronic article to provide information regarding a location in which attempted use of non-compatible electronic article was attempted.

Preferably, an electronic article includes a product identifying compound sensor switch operably coupled to control electronics configured to control delivery of an aerosol from the electronic article. Preferably, the control electronics are configured to control delivery of the aerosol based on data received from the sensor. For example, if the container is authenticated and the contents of the container are identified, the control electronics may tailor the delivery or generation and delivery of an aerosol based on the contents of the container. In some embodiments, the control electronics are configured to prevent the article from delivering an aerosol from the article based on data received from the sensor. For example, if a product identifying compound is not detected by a sensor, the control electronics may prevent delivery of the aerosol from the device.

In some embodiments where the electronic article is configured to prevent delivery of an aerosol, the electronic article includes a controllable valve operably coupled to a product identifying compound sensor. The valve may be positioned along a flow path that extends from the aerosol generating substrate to a mouth end of the electronic article. The valve may be configured to adapt default a configuration, such as closed, to prevent delivery of aerosol to a user unless the product identifying compound (or appropriate combination of compounds) is detected. Alternatively, the valve may be configured to adapt a default configuration, such as open, to allow delivery of aerosol to a user, and if a product identifying compound is not detected, the valve may adapt a configuration to prevent delivery of the aerosol.

In some embodiments where the electronic article is configured to prevent delivery of an aerosol, the electronic article includes a heater configured to heat a substrate to generate an aerosol to be delivered to a user. The heater may be operably coupled to a product identifying compound sensor. The heater may be prevented from being activated unless a product identifying compound is detected by the sensor. Alternatively, the heater may be configured to adapt a default configuration of being activated, and if a product identifying compound is not detected, the heater may be inactivated. In such cases, some amount of aerosol may be available for delivery to user due to prior heating of the substrate.

In some embodiments, an electronic article includes a heater configured to heat a substrate to generate an aerosol to be delivered to a user and includes a controllable valve, such as a valve as discussed above.

Alternatively or in addition to preventing an amount of aerosol from being delivered from the electronic article, control electronics of the electronic article may be operably coupled to alarm apparatus to provide an alert that a product identifying compound has not been detected. Alarm apparatus may include, for example, apparatus that when activated cause the electronic article to vibrate, a speaker to provide an audible sound, led lights that may flash, and a display for presenting a warning. Alternatively, the alarm apparatus may be external to the electronic article and coupled to output apparatus of the electronic article. Alarm apparatus may include, for example, a smart mobile phone.

It will be understood that the preferred embodiments described herein may be combined in any suitable manner. For example, an electronic article configured to prevent delivery of an aerosol when a product identifying compound is not detected may also be configured to one or both of store and output information regarding data obtained by a product identifying compound sensor.

In some embodiments, an electronic article of the present invention includes one or more components that cause sensor detection components to be activated when a container housing the substrate is received by the electronic article. For example, the electronic article may include a switch that is positioned and actuated when the container is received by the electronic article. Actuation of the switch may cause the one or more sensor detection components to be activated. Such activation of the detection components may serve to save power, such as battery power, by not causing power to be diverted to the detection components when not needed. In some embodiments, the one or more detection components are deactivated after a certain period of time even if the substrate or container is not removed from the housing.

In addition or alternatively, the one or more detection components may be activated on a time frequency basis, rather than always remaining activated. In addition or alternatively, the one or more detection components may be activated when a user takes a puff from the electronic article. In such embodiments, puff detection components may be operably coupled to switches comprising the sensors. An electronic article of the present invention may include any suitable puff detection component such as a microphone, a thermocouple, or those described in, for example WO 2013/098398 or WO 2010/003480.

In some preferred embodiments, an electronic article as described herein is an electronic smoking article that employs heat but not burn tobacco consumables and has a main unit and a tobacco stick holder for receiving the consumable container, such as a tobacco rod. One or more switches comprising sensors may be incorporated, for example, in the tobacco stick holder, and the switches may be coupled to control electronics in the main unit. In some preferred embodiments where the electronic articles are electronic cigarettes or vaping systems that employ cartridges or the like as consumables with liquid compositions containing, for example, nicotine. One or more sensors may be directly incorporated in the electronics of the device. It will be understood that other suitable configurations are contemplated herein and are readily achievable based on the disclosure presented herein.

All scientific and technical terms used herein have meanings commonly used in the art unless otherwise specified. The definitions provided herein are to facilitate understanding of certain terms used frequently herein.

As used herein, the singular forms "a", "an", and "the" encompass embodiments having plural referents, unless the content clearly dictates otherwise.

As used herein, "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Referring now to the drawings, in which some aspects of the present invention are illustrated. It will be understood that other aspects not depicted in the drawings fall within the scope and spirit of the present invention. The drawings are schematic drawings and are not necessarily to scale. Like numbers used in the figures refer to like components, steps and the like. However, it will be understood that the use of a number to refer to a component in a given figure is not intended to limit the component in another figure labelled with the same number. In addition, the use of different numbers to refer to components in different figures is not intended to indicate that the different numbered components cannot be the same or similar to other numbered components.

Figure 1A:
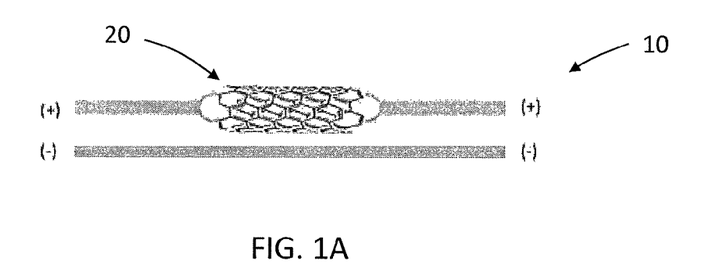
FIGS. 1A-D are schematic diagrams depicting a portion of a circuit comprising an electrochemical sensor (1A, 1C) and corresponding states of standard switches (1B, 1D).
Figure 1B:
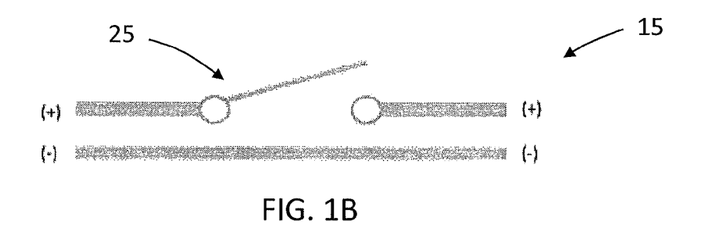
Figure 1C:
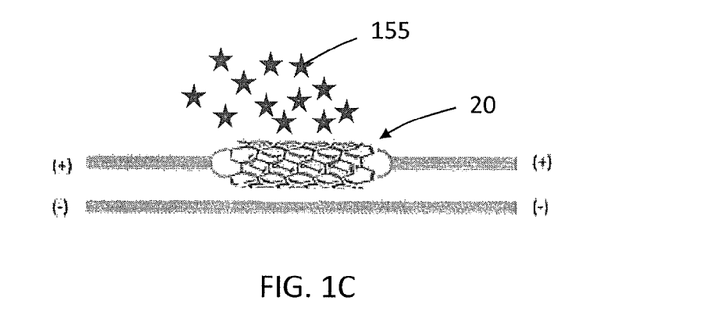
Figure 1D:
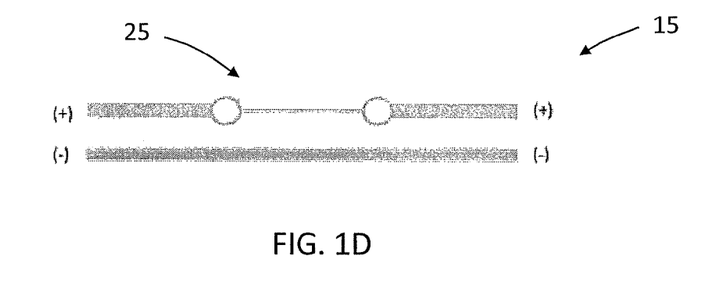

A circuit 10 having an electrochemical sensor switch 20 is shown in FIG. 1A, which corresponds to a circuit 15 having a standard "open" switch 25 (FIG. 1B, shown merely for purposes of illustration). A circuit 10 having an electrochemical sensor switch 20 in the presence of product identifying compound 155 is shown in FIG. 1C. The circuit 15 depicted in FIG. 1D, in which the standard switch 25 is closed, is shown merely for purposes of illustrations and corresponds to the circuit 10 shown in FIG. 1C. As shown in FIGS. 1A-D, in the absence of the product identifying compound, the electrochemical sensor switch 15 is "open" (FIG. 1A). In the presence of the product identifying compound 155, the semiconductor or electrical properties of the electrochemical sensor switch 20 change to cause the circuit to close (FIG. 1C). In some embodiments (not shown), the electrochemical switch is "closed" in the absence of the product identifying compound and "open" in the presence of the product identifying compound.

In some preferred embodiments, the electrochemical sensor switch may comprise chemiresistive or semiconductive materials, such as carbon nanotubes coated with a polythiophene, such as a calixarene-substituted type of material as host-guest chemistry, as well as graphene substrates impregnated with a polythiophene, or carbon nanotube/metalloporphyrin composites. Any other suitable electrochemical sensor may be employed as an electrochemical switch.

The electrochemical switches described herein assume relatively open and closed positions based on a change in resistivity or conductivity, rather than being absolutely open or closed. The change is resistivity or conductivity in the presence of the product identifying compounds relative to the absence of the product identifying compound is preferably at least 20%, such as at least 30%, at least 40%, or at least 50%.

Figure 2:
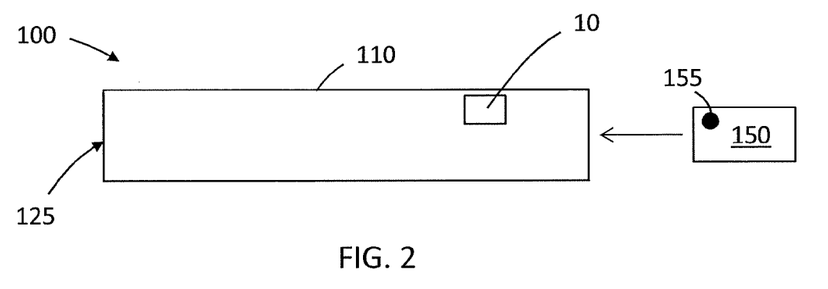
FIGS. 2-3 are schematic diagrams side views of electronic articles according to various embodiments of the present invention.

Referring now to FIG. 2, an electronic article 100 in accordance with various embodiments of the present invention includes a housing 110. The housing 110 may be formed of a single piece or multiple interconnected pieces. The housing 110 defines a mouth end 125. The housing 110 is configured to receive a container 150 housing an aerosol generating substrate. While depicted in FIG. 2 as receiving the container 150 at an end opposite the mouth end 125, the housing 110 may be configured to receive the container 150 at any suitable location. One or more product identifying compounds 155 may be associated with container 150. The electronic article 100 includes one or more sensor switches 10 for detecting the one or more product identifying compounds 155 associated with the container 150. One or more electrical components (not shown in FIG. 2) operably coupled to sensor 10 may be disposed in the housing 110.

In some embodiments, the container 150 may be a wrapper that circumscribes a tobacco rod, and the electronic article 100 may be configured to heat but not burn the tobacco rod to generate an aerosol that a consumer may inhale via the mouth end 125. In some embodiments, the container 150 may be a cartridge comprising an e-liquid, and the electronic device 100 may be an e-cigarette or vaping device.

Figure 3:
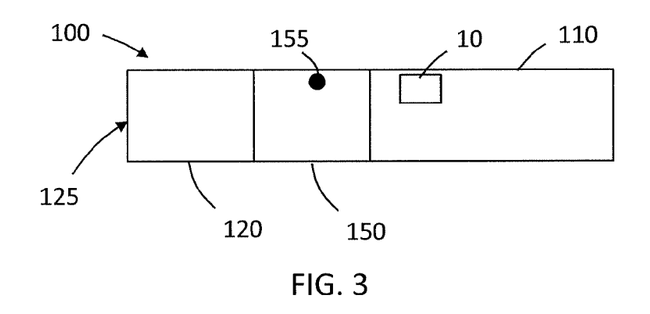

Referring now to FIG. 3, an electronic article 100 in accordance with various embodiments of the present invention includes a housing 110 that has a mouthpiece 120 and is configured to receive a container 150 containing an aerosol generating substrate. The mouthpiece 120 defines a mouth end 125. One or more product identifying compounds 155 may be associated with container 150. The electronic article 100 includes one or more sensor switches 10 for detecting the one or more product identifying compounds 155 associated with the container 150. One or more electrical components (not shown in FIG. 3) operably coupled to sensor switch 10 may be disposed in the housing 110.

Figure 4:
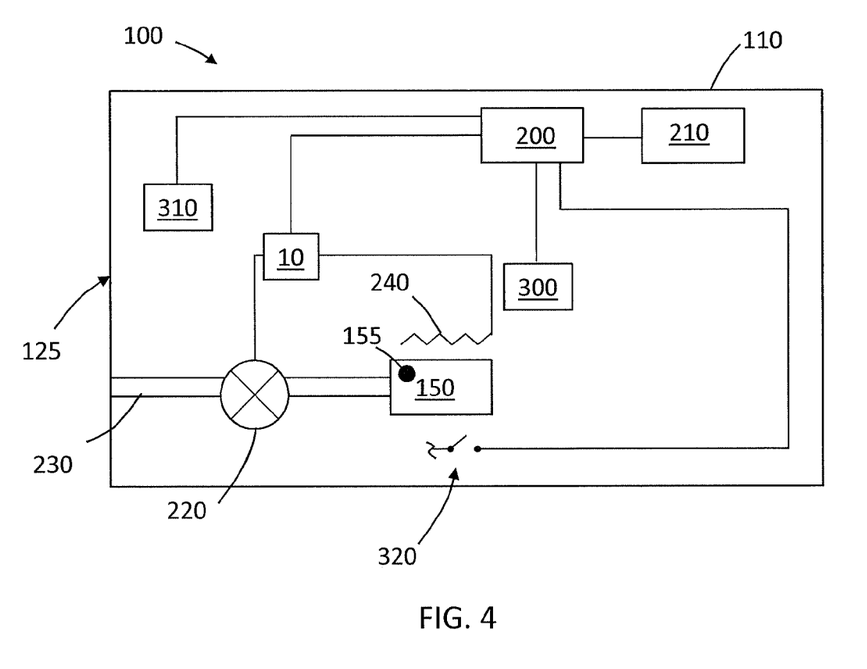
FIG. 4 is a schematic diagram illustrating some components of an electronic article according to various embodiments of the present invention.

Referring now to FIG. 4, an electronic article 100 in accordance with various aspects of the present invention includes a housing 110 configured to receive a container 150 housing an aerosol generating substrate. The housing 110 includes a mouth end 125. One or more product identifying compounds 155 are associated with container 150. The electronic article 100 includes a product identifying compound electrochemical sensor switch 10. The electronic article 100 includes a power source 210 operably coupled to control electronics 200. Power source 210 may be any suitable power source, such as a battery, a capacitor, or the like. Preferably, the power source 210 comprises a rechargeable battery, such as a rechargeable lithium ion battery, a rechargeable nickel-cadmium battery, or the like.

In the embodiment depicted in FIG. 4, the control electronics 200 are operably coupled heater 240 and valve 220 via sensor switch 10. Valve 220 is positioned along a pathway 230 that extends from container 150 to mouth end 125 through which aerosol generated by substrate may be transported. Valve 220 may adapt an open or closed configuration to allow or prevent the aerosol from traveling from substrate housed in container 150 to mouth end 125. Valve 220 may be configured to adapt a closed position unless electrochemical sensor switch 10 is closed, which may occur in the presence of product identifying compound 155 associated with container 150. When the switch 10 closes the circuit, valve 220 may open to allow aerosol to flow through passageway 230.

Heater 240 is positioned in contact with or in proximity to container 150 and is configured to heat substrate to cause an aerosol to be generated by the substrate. If the electrochemical switch 10 is closed (in the presence of product identifying compound) and electricity may flow to heater 240, which may comprise a resistive element, to cause the substrate to be heated and aerosol to be formed.

The example depicted in FIG. 4 shows both heater 240 and valve 220 operably coupled to control electronics 200 thorough electrochemical switch 10. However, in some embodiments (not shown), only the heater or only the valve are coupled to the control electronics through the electrochemical switch. In some embodiments, the article 100 may include only one of a heater and a valve and not both as depicted in FIG. 4. In some embodiments, the electrochemical switch is not positioned in a circuit with the valve or the heater, but rather on a separate circuit coupled to control electronics, which may detect closing or opening of the electrochemical switch to appropriate control one or both of the valve and the heater.

In the embodiment depicted in FIG. 4, the electronic article 100 includes location identifying apparatus 300, such as GPS or assisted-GPS apparatus, to permit identification of the location of the article 100. The article 100 also includes transmission apparatus 310 operably coupled to the control apparatus 200. Control apparatus 200 may cause transmission apparatus 310 to transmit the location of the article 100 if a suspected counterfeit container 150 is inserted into the housing 110.

The depicted electronic article 100 also includes a switch 320 that is actuated by inserting the container 150 in the housing 110. If activation of switch 320 is detected but activation of electrochemical switch 10 is not detected, control electronics may interrogate GPS apparatus 300 to identify the location of the article 100 and to transmit the location via transmission apparatus 310 as a location of an attempt to employ a counterfeit container 150 or aerosol generating substrate.

Figure 5:
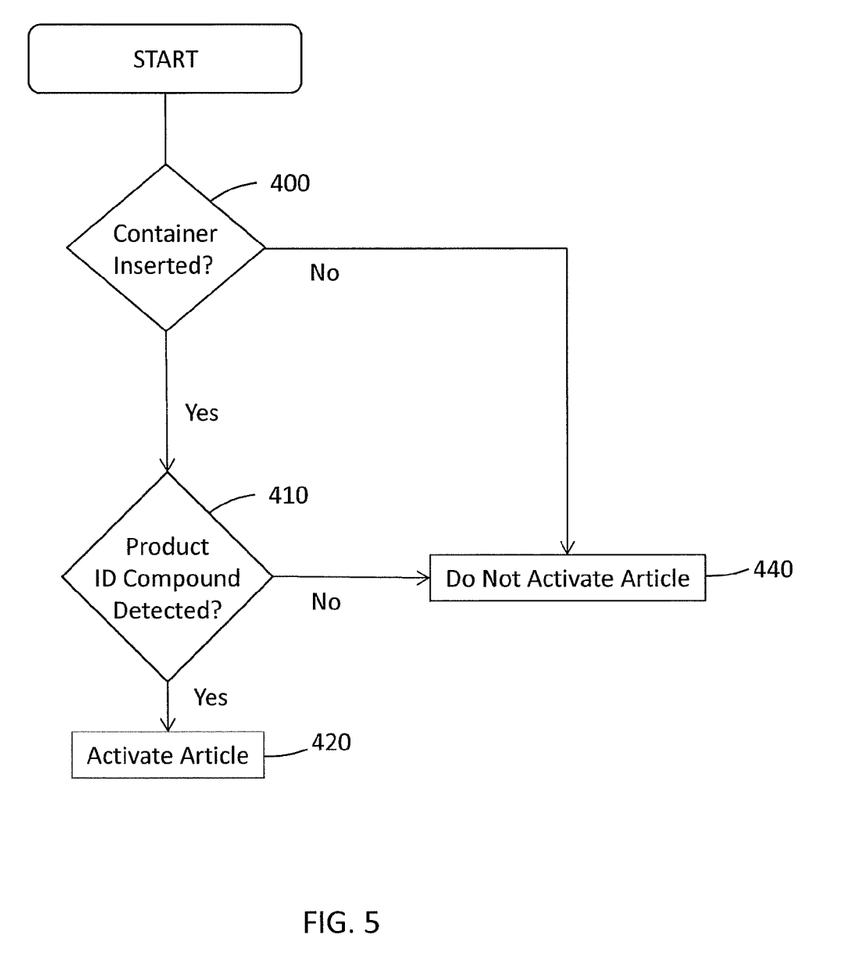
FIG. 5 is a flow chart illustrating aspects of a process that may be carried out by an electronic article in accordance with various aspects of the present invention.

Referring now to FIG. 5, a flow diagram is shown illustrating a process that may be carried out by an electronic article or system according to various embodiments of the present invention. At step 400, a determination is made as to whether a container containing an aerosol generating substrate is inserted into the electronic article. This may be determined by, for example, determining whether switch 320 as depicted in FIG. 4 is actuated. If the container is inserted, a determination is then made as to whether the product identifying compound is detected (420), for example, by determining whether the electrochemical switch is closed. If the product identifying compound is not detected, the electronic article is not activated (440). If the product identifying compound is detected (for example, the electrochemical switch is closed), control electronics may, for example, activate the electronic device. Activation of the electronic device may include activation of a heater (such as heater 240 depicted in FIG. 4), activation of a valve (such as valve 220 depicted in FIG. 4), or activation of a heater and a valve to allow an aerosol from a substrate to be delivered to a user (such as through pathway 230 as depicted in FIG. 4).

Thus, methods, systems, devices, compounds and compositions for PRODUCT RECOGNITION IN AEROSOL GENERATING DEVICES are described. Various modifications and variations of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in electronic article manufacturing or related fields are intended to be within the scope of the following claims.

The invention claimed is:

1. A system comprising:
   a container housing an aerosol generating substrate;
   a product identifying compound associated with the container; and
   an electronic article configured to receive the container, the electronic article comprising:
      control electronics;
      an electrochemical sensor switch operably coupled to the control electronics, the electrochemical sensor switch configured to change from a first state to a second state when the product identifying compound interacts with the electrochemical sensor switch, wherein the electrochemical sensor switch has a different conductivity in the first state than in the second state; and
      a heater, a controllable valve, or a heater and a controllable valve, operably coupled to the control electronics via the electrochemical sensor switch,
   wherein the control electronics are configured to cause the electronic article to generate an aerosol from the aerosol generating substrate when the electrochemical sensor switch changes from the first state to the second state.

2. The system according to claim 1, wherein the second state has at least a 20% greater conductivity than the first state.

3. The system according to claim 2, wherein the heater is configured to heat the aerosol generating substrate when the container is received by the electronic article, and wherein the electrochemical sensor switch prevents the control electronics from operating the heater unless the product identifying compound interacts with the electrochemical sensor switch to cause the electrochemical sensor switch to the second state.

4. The system according to claim 2, wherein the electronic article includes the controllable valve positioned along a flow path between a mouth end of the article and the aerosol generating substrate when the substrate is received by the article, wherein the controllable valve is configured to adapt a configuration that allows flow of the aerosol from the substrate to the mouth end and to adapt a configuration that prevents flow of the aerosol from the substrate to the mouth end, wherein the electrochemical sensor switch prevents the control electronics from causing the controllable valve to adapt a configuration that allows flow of the aerosol from the substrate to the mouth end unless the product identifying compound interacts with the electrochemical sensor switch to cause the electrochemical sensor switch to the second state.

5. The system according to claim 1, wherein the electronic article comprises the heater configured to heat the aerosol generating substrate when the container is received by the electronic article and when the heater is activated by the control electronics, wherein the control electronics are configured to activate the heater when the electrochemical sensor switch is in the second state.

6. The system according to claim 1, wherein the electronic article includes the controllable valve positioned along a flow path between a mouth end of the article and the aerosol generating substrate when the substrate is received by the article, wherein the controllable valve is configured to adapt a configuration that allows flow of the aerosol from the substrate to the mouth end and to adapt a configuration that prevents flow of the aerosol from the substrate to the mouth end, wherein the control electronics are configured to cause the controllable valve to adapt a configuration that allows flow of the aerosol from the substrate to the mouth end when the electrochemical sensor switch is in the second state.

7. The system according to claim 1, wherein the container comprises a wrapper and the aerosol generating substrate comprises a tobacco rod, wherein the wrapper circumscribes the rod.

8. The system according to claim 1, wherein the aerosol generating substrate comprises a nicotine-containing liquid composition or a nicotine-containing dry powder.

9. The system according to claim 1, wherein the product identifying compound is volatile or is carried by a volatile solvent.

10. The system according to claim 1, wherein the electronic article comprises a location identifying apparatus operably coupled to the control electronics and a transmission apparatus operably coupled to the control electronics.

11. The system according to claim 10, wherein the control electronics are configured to interrogate the location identification apparatus to identify a location of the electronic article and to transmit the location of the electronic article via the transmission apparatus if the container is received by the electronic article and the electrochemical sensor switch is in the first state.

12. The system according to claim 1, wherein the electronic article comprises two or more electrochemical sensor switches, each configured to detect a presence of a different product identifying compound, and wherein more than one product identifying compound is associated with the container.

13. An electronic article configured to receive a container housing an aerosol generating substrate, the container including a product identifying compound, the electronic article comprising:
control electronics;
an electrochemical sensor switch operably coupled to the control electronics, the electrochemical sensor switch configured to change from a first state to a second state when the product identifying compound interacts with the electrochemical sensor switch, wherein the electrochemical sensor switch has a different conductivity in the first state than in the second state; and
a heater, a controllable valve, or a heater and a controllable valve, operably coupled to the control electronics via the electrochemical sensor switch,
wherein the control electronics are configured to cause the electronic article to generate an aerosol from the aerosol generating substrate when the electrochemical sensor switch is in the second state.

14. A system comprising:
the electronic article according to claim 13; and
a nicotine-containing device comprising:
a container;
a nicotine-containing aerosol generating substrate disposed in the container; and
a product identifying compound associated with the container,
wherein the product identifying compound is configured to be detected by the electrochemical sensor switch of the electronic aerosol generating article to allow the article to generate an aerosol from the aerosol generating substrate when the container is received in the article.

15. The system according to claim 14, wherein the container comprises a wrapper and the aerosol generating substrate comprises a tobacco rod, wherein the wrapper circumscribes the rod.

* * * * *